March 23, 1926.　　　　　　　　　　　　　　　1,577,792
F. J. G. DUCK ET AL
AUTOMOBILE TIRE CARRIER
Filed Oct. 22, 1923
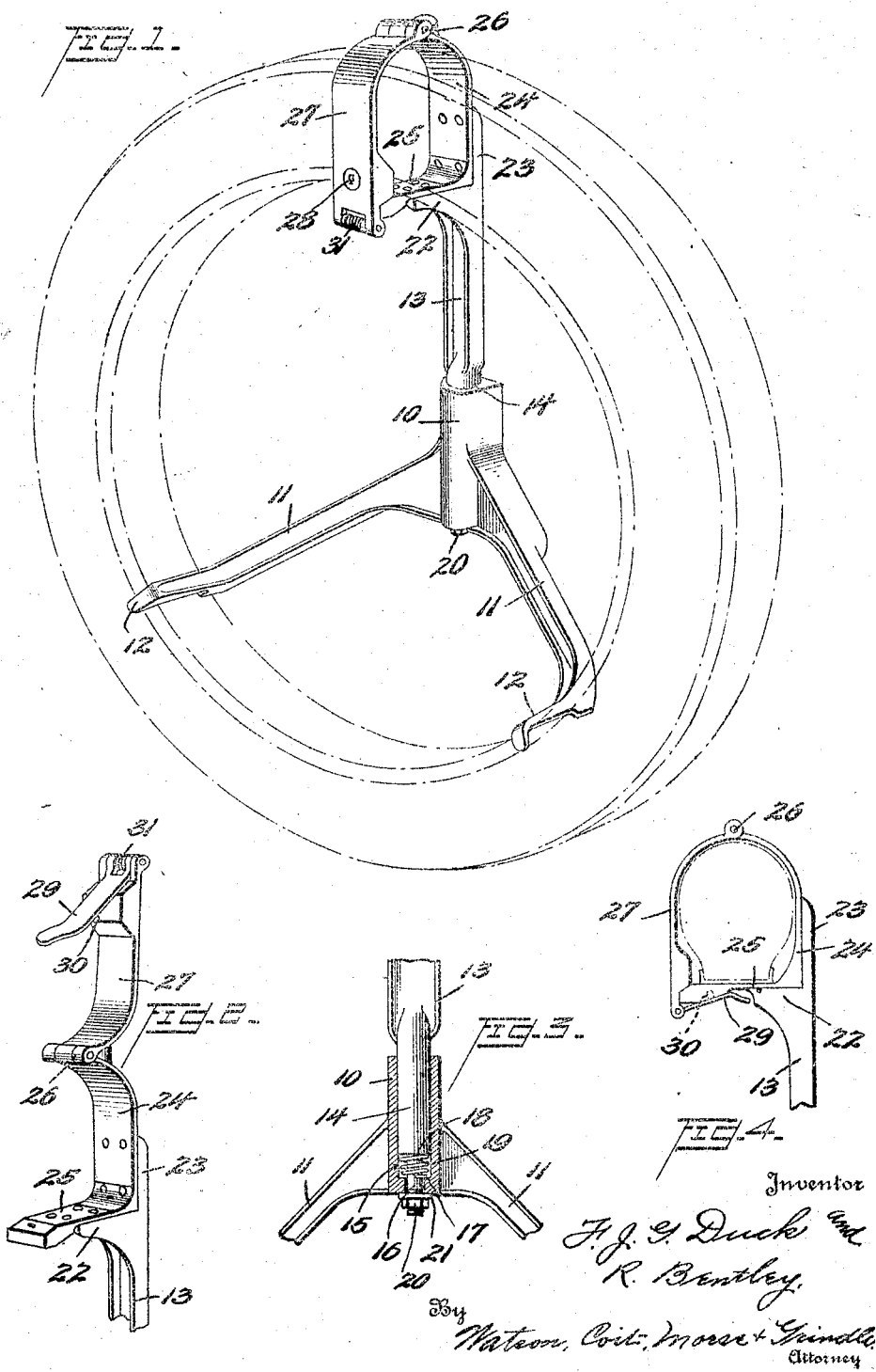

Patented Mar. 23, 1926.

1,577,792

UNITED STATES PATENT OFFICE.

FRANK J. G. DUCK, OF SCRANTON, AND ROWLAND BENTLEY, OF DUNMORE, PENNSYLVANIA.

AUTOMOBILE TIRE CARRIER.

Application filed October 22, 1923. Serial No. 670,148.

*To all whom it may concern:*

Be it known that we, FRANK J. G. DUCK and ROWLAND BENTLEY, citizens of the United States, and residents of Scranton, county of Lackawanna, State of Pennsylvania, and Dunmore, county of Lackawanna, State of Pennsylvania, respectively, have invented certain new and useful Improvements in Automobile Tire Carriers, of which the following is a specification.

The present invention relates to combination tire carriers and locks adapted to be secured to automobiles for carrying spare tires, and its object is to provide a device of this character in which the spare tire supporting device is so combined with a locking device that the resultant structure provides in a unitary structure, not only a simple, strong and efficient tire support but also a tire locking device which prevents unauthorized removal of the tire supporting rim and of the tire itself. The invention has a number of novel features of construction and in the accompanying drawings, one embodiment of the invention is illustrated by way of example.

Figure 1 is a perspective view of the combined tire carrier and locking device, the tire rim and tire being indicated in dot and dash lines;

Figure 2 is a perspective view of the tire locking device, the swinging member being illustrated in open or unlocked position;

Figure 3 is a front elevation, partly broken away, of the central portion of the tire carrying device; and Figure 4 is a side view of the tire locking device the parts being illustrated in closed or locked position.

The tire carrier comprises essentially a central portion or block 10 having downwardly and outwardly extending legs 11 provided with rim engaging feet 12, and an upwardly extending leg 13 also provided with means to engage the inner surface of a tire supporting rim. The leg 13 is not integral with block 10 but has a cylindrical lower portion 14 which is slidably received within a correspondingly formed recess 15 in block 10. The extreme lower end 16 of leg 13 is of reduced section and the lower end of recess 15 is correspondingly reduced so that the recess has an upwardly facing annular shoulder 17 adjacent its lower end. Between this upwardly facing shoulder 17 and the downwardly facing shoulder 18 of leg 13, and encircling the reduced spindle-like portion 16 of the leg 13, is a coiled spring 19 which normally holds the rim engaging portion of this leg in such position that the spring must be slightly compressed when placing the tire on the carrier. A retaining nut 20 and washer 21 on the lower end of spindle 16 prevent the leg 13 from being displaced from its socket.

At its upper end the leg 13 is formed with two flanges 22 and 23 disposed at right angles to each other, and in the angle between these flanges is secured the stationary portion 24 of the tire encircling and locking device. The member 24 has a lower or tread portion 25 to receive the rim of the tire, and hinged to this member at 26 is the movable or swinging portion 27 of the tire lock. The outer end of this swinging portion is provided with a lock 28 adapted to be manipulated by a key to cause this portion to be securely locked to the outer end of tread 25 of the stationary member 24. Also secured to the extreme end of swinging portion 27 is a pivoted latch 29 having a tooth or locking portion 30 adapted to enter a correspondingly formed recess in the lower side of member 25. A spring 31 normally tends to maintain this latch in locking position.

To remove a tire which is positioned as shown in Figure 1, it is only necessary to unlock and unlatch the movable member 27 of the tire locking device, lift the same, and slide the rim off of the member 25. In replacing the tire the rim is first placed in contact with the feet 12 of the tire carrier and pressure exerted upon the top of the tire to cause it to slide up the inclined surface of the outer end of member 25 and into position as shown in Figure 4, the spring 19 being slightly compressed in this operation. The member 27 is then swung to the position in which it is shown in Figure 4, the latch 29 engaging with the corresponding catch, and lock 28 turned by means of a key, preferably the same key which controls the ignition and gear lock. Lock 28 may, of course, be a spring lock, if desired. The spring 19 constantly exerts an upward force on the leg 13, holds the tire against movement, and prevents rattling of the parts.

If desired, the device may be easily modified to carry and lock two tires instead of one. In case no spare tire is carried rattling of the holder is prevented by the action of spring 19 in connection with the nut 20 and washer 21. Or, if the operator so desires, the leg 13 can be entirely removed and carried elsewhere. The tire carrying device disclosed is neat and attractive in appearance, simple, convenient, strong, and is thoroughly thief-proof, the tire being held against unauthorized removal at all times.

Having thus described the invention what is claimed as new and desired to be secured by Letters Patent is:

1. In a tire carrier, in combination, a member adapted to be secured to an automobile, two legs rigid with said member and having portions adapted to engage a tire rim, a third leg supported by said member, a rim engaging portion on said third leg provided with an inclined face at its outer end, and means for automatically extending said third leg to press against a tire rim, whereby a rim may be placed on the carrier by sliding it along said inclined face against the pressure exerted by said extending means.

2. In a tire carrier, in combination, a member adapted to be secured to an automobile, two legs rigid with said member and having portions adapted to engage a tire rim, a third leg supported by said member, a rim engaging portion on said third leg provided with an inclined face at its outer end, means for automatically extending said third leg to press against a tire rim, whereby a rim may be placed on the carrier by sliding it along said inclined face against the pressure exerted by said extending means, and a locking device secured to said third leg and adapted to encircle a rim and tire, said locking device having a hinged portion provided with a key controlled lock and a spring latch, for the purpose set forth.

3. In a tire carrier, in combination, a member adapted to be secured to an automobile, two legs rigid with said member and having portions adapted to engage a tire rim, a recess in said member, a third leg slidably mounted in said recess, a spring in said recess tending to move said third leg outwardly, means for limiting the outward movement of said third leg, and a rim engaging portion on said third leg provided with an inclined face at its outer end, whereby a rim may be placed on the carrier by sliding it along said inclined face against the pressure exerted by said spring.

In testimony whereof we hereunto affix our signatures.

FRANK J. G. DUCK.
ROWLAND BENTLEY.